United States Patent
Boyer et al.

(10) Patent No.: US 8,899,115 B2
(45) Date of Patent: Dec. 2, 2014

(54) METHOD AND SYSTEM FOR LOCATING A LASER VIBROMETER DURING NON-CONTACT SCANNING

(75) Inventors: Jesse R. Boyer, Manchester, CT (US); Randall W. Joyner, Union, CT (US)

(73) Assignee: United Technologies Corporation, Hartford, CT (US)

( * ) Notice: Subject to any disclaimer, the term of this patent is extended or adjusted under 35 U.S.C. 154(b) by 742 days.

(21) Appl. No.: 13/090,815

(22) Filed: Apr. 20, 2011

(65) Prior Publication Data

US 2012/0266680 A1     Oct. 25, 2012

(51) Int. Cl.
*G01D 5/32* (2006.01)
*G01B 11/16* (2006.01)
*G01B 11/25* (2006.01)

(52) U.S. Cl.
CPC .............. *G01B 11/25* (2013.01); *G01B 11/161* (2013.01); *G01B 11/2545* (2013.01)
USPC .......................................................... 73/655

(58) Field of Classification Search
CPC ...... G01H 9/00; G01H 9/004; G01N 29/2418
USPC .................................................... 73/657, 660
See application file for complete search history.

(56) References Cited

U.S. PATENT DOCUMENTS

| | | | |
|---|---|---|---|
| 3,667,846 A * | 6/1972 | Nater et al. .................... | 356/623 |
| 4,554,836 A * | 11/1985 | Rudd .............................. | 73/657 |
| 5,270,789 A | 12/1993 | Falco et al. | |
| 6,271,924 B1 | 8/2001 | Ngoi et al. | |
| 6,387,214 B1 * | 5/2002 | Kustermann et al. ......... | 162/198 |
| 6,545,762 B2 * | 4/2003 | Lewis et al. .................... | 356/502 |
| 6,763,723 B1 * | 7/2004 | Zook et al. ....................... | 73/657 |
| 6,999,073 B1 * | 2/2006 | Zwern et al. ................... | 345/420 |
| 7,024,787 B2 | 4/2006 | Varsell et al. | |
| 7,064,811 B2 * | 6/2006 | Twerdochlib ................... | 356/24 |
| 7,079,258 B2 * | 7/2006 | Selbach et al. ................ | 356/502 |
| 7,460,250 B2 * | 12/2008 | Keightley et al. ............. | 356/625 |
| 7,573,586 B1 | 8/2009 | Boyer et al. | |
| 7,578,178 B2 | 8/2009 | Boyer et al. | |
| 7,654,145 B2 * | 2/2010 | Twerdochlib ................... | 73/660 |
| 7,778,788 B2 | 8/2010 | Joyner et al. | |
| 7,836,772 B2 | 11/2010 | Twerdochlib | |
| 7,869,026 B2 | 1/2011 | Boyer et al. | |
| 2003/0066949 A1 * | 4/2003 | Mueller et al. ............. | 250/208.1 |
| 2003/0163908 A1 * | 9/2003 | Kaji et al. ..................... | 29/25.35 |
| 2007/0084643 A1 * | 4/2007 | Hill ............................. | 178/18.04 |
| 2009/0033947 A1 | 2/2009 | Boyer et al. | |
| 2012/0229607 A1 * | 9/2012 | Baker et al. ..................... | 348/46 |

* cited by examiner

*Primary Examiner* — Peter Macchiarolo
*Assistant Examiner* — Alex Devito

(57) ABSTRACT

A method and system are provided for inspecting a surface of an object with an optical scanner and a laser vibrometer. The method includes the steps of: (a) mapping at least a portion of the object surface using the optical scanner; (b) projecting a beam of light from the laser vibrometer onto the object surface at a measurement point; (c) locating the measurement point relative to the object surface using the optical scanner; and (d) measuring a position of the object surface using the laser vibrometer to determine, for example, a deflection of the object surface.

16 Claims, 3 Drawing Sheets

METHOD AND SYSTEM FOR LOCATING A LASER VIBROMETER DURING NON-CONTACT SCANNING

BACKGROUND OF THE INVENTION

1. Technical Field

This disclosure relates generally to non-contact scanning and, more particularly, to a method and system for spatially locating a laser vibrometer relative to an object.

2. Background Information

Machinery components or objects (e.g., gas turbine rotor blades) can be inspected using non-contact scanning. Vibrationally induced deflections and stresses of the component, for example, can be determined using data measured by a laser vibrometer. The deflections and stresses can subsequently be processed to predict or model how the component will respond to vibrations during operation of the component within the machinery (e.g., performance of the rotor blade within the gas turbine engine). In order to produce accurate predictions and models, however, the position of the vibrometer and, thus, the position of where the data is being measured on the component surface must be located relative to the component. The vibrometer can be located, for example, by (i) mechanically aligning the vibrometer and the rotor blade in known positions, or (ii) performing post processing alignment procedures such as, for example, normalizing measurement data to a normal or reference coordinate space. Both methods for locating the vibrometer, however, require certain base assumptions (e.g., that the component is close to a nominal geometric location and shape, that the surface of the component can be represented by a two dimensional planar surface, that non-scalar image data can be used as a reference, etc.) and can increase time and costs associated with performing the inspection.

SUMMARY OF THE DISCLOSURE

According to a first aspect of the invention, a method is provided for inspecting a surface of an object with an optical scanner and a laser vibrometer. The method includes the steps of: (a) mapping at least a portion of the object surface using the optical scanner; (b) projecting a beam of light from the laser vibrometer onto the object surface at a measurement point; (c) locating the measurement point relative to the object surface using the optical scanner; and (d) measuring a position of the object surface using the laser vibrometer.

According to a second aspect of the invention, a system for inspecting a surface of an object includes a laser vibrometer, an optical scanner and a controller. The vibrometer is adapted to project a beam of light onto the object surface at a measurement point, and to measure a position of the object surface. The optical scanner is adapted to map at least a portion of the object surface, and to locate the measurement point relative to the object surface. The controller is adapted to correlate the measured position of the object surface to the location of the measurement point.

The foregoing features and the operation of the invention will become more apparent in light of the following description and the accompanying drawings.

DETAILED DESCRIPTION OF THE INVENTION

Figure 1:
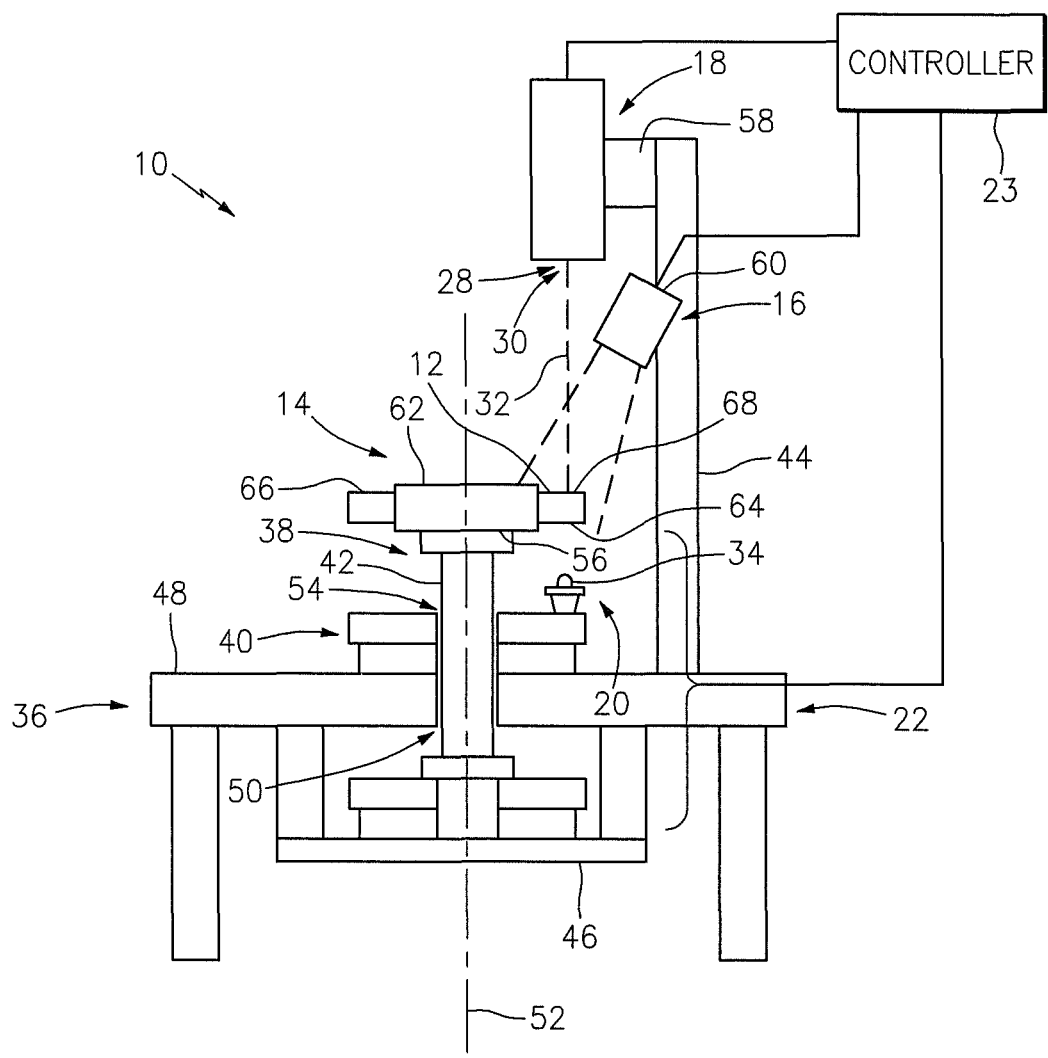
FIG. 1 is a diagrammatic illustration of a system for inspecting a surface of an object.

FIG. 1 illustrates a system 10 for inspecting a surface 12 of an object such as a rotor blade, generally referred to hereinafter as an "object 14". The system includes an optical scanner 16, a laser vibrometer 18, an excitation system 20, a support stand 22 and a controller 23.

Figure 2:
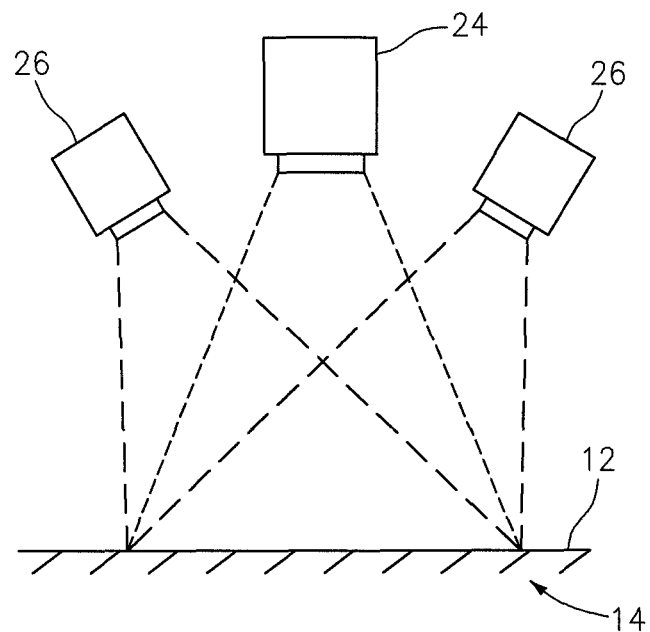
FIG. 2 is a diagrammatic illustration of an optical scanner included in the system illustrated in FIG. 1.

Referring to FIGS. 1 and 2, the optical scanner 16 is adapted to map at least a portion of the object surface 12. The term "map" is used herein to describe a process of applying a triangulated mesh of surface points to an object surface. In the embodiment shown in FIG. 2, the optical scanner 16 includes a fringe pattern projector 24 and one or more cameras 26. The projector 24 is adapted to project a point, line and/or pattern of light at one or more projection frequencies. Each camera 26 is adapted to capture an image within a light intensity band and a camera frequency band, which camera frequency band includes the projection frequencies. An example of such a projector and cameras is disclosed in U.S. Patent Application Publication No. 2009/0033947, which is hereby incorporated by reference in its entirety. The position of the projected mesh can be located relative to the object in several ways.

The vibrometer 18 (also sometimes referred to as a "laser Doppler vibrometer" or an "interferometer") is adapted to measure a relative spatial position of the object surface 12. The vibrometer 18 includes a laser 28 and a light detector 30. The laser 28 is adapted to project a beam of light 32 at a vibrometer frequency and a vibrometer light intensity. The light detector 30 is adapted to detect a reflection of the beam of light 32 having a reflection frequency. In some embodiments, the vibrometer frequency is selected such that the reflection frequency is outside (e.g., greater than) the camera frequency band.

The excitation system 20 is adapted to induce vibrations in at least a portion of the object 14. In the embodiment shown in FIG. 1, the excitation system 20 includes a loudspeaker 34 adapted to transmit an audio excitation signal.

The support stand 22 includes a base 36, an object turntable 38, an excitation system turntable 40, an object support 42 and sensor mounting stand 44. The base 36 includes a lower platform 46 and an upper platform 48. The upper platform 48 has an aperture 50 that extends along an axis 52. The object turntable 38 is mounted to the lower platform 46, and is adapted to rotate about the axis 52. The excitation system turntable 40 is mounted to the upper platform 48, and is adapted to rotate about the axis 52. The excitation system turntable 40 includes a central aperture 54 that extends along the axis 52. The object support 42 extends along the axis 52 from the object turntable 38, through the apertures 50 and 54, to an object support surface 56. The sensor mounting stand 44 includes a vibrometer mount 58 and a scanner mount 60. The sensor mounting stand 44 extends from the upper platform 48 to the vibrometer mount 58.

The optical scanner 16 is connected to scanner mount 60. The vibrometer 18 is connected to the vibrometer mount 58. The loudspeaker 34 is connected to the excitation system turntable 40.

The controller 23 can be implemented using hardware, software, or a combination thereof. The hardware can include one or more processors, analog and/or digital circuitry, etc. In some embodiments, for example, the controller can include one or more sub-processors (not shown) respectively configured with the optical scanner 16 and the vibrometer 18. The controller is in signal communication (e.g., hardwired or wirelessly connected) with the optical scanner 16, the vibrometer 18, the loudspeaker 34, the object turntable 38 and the excitation system turntable 40.

Figure 3:
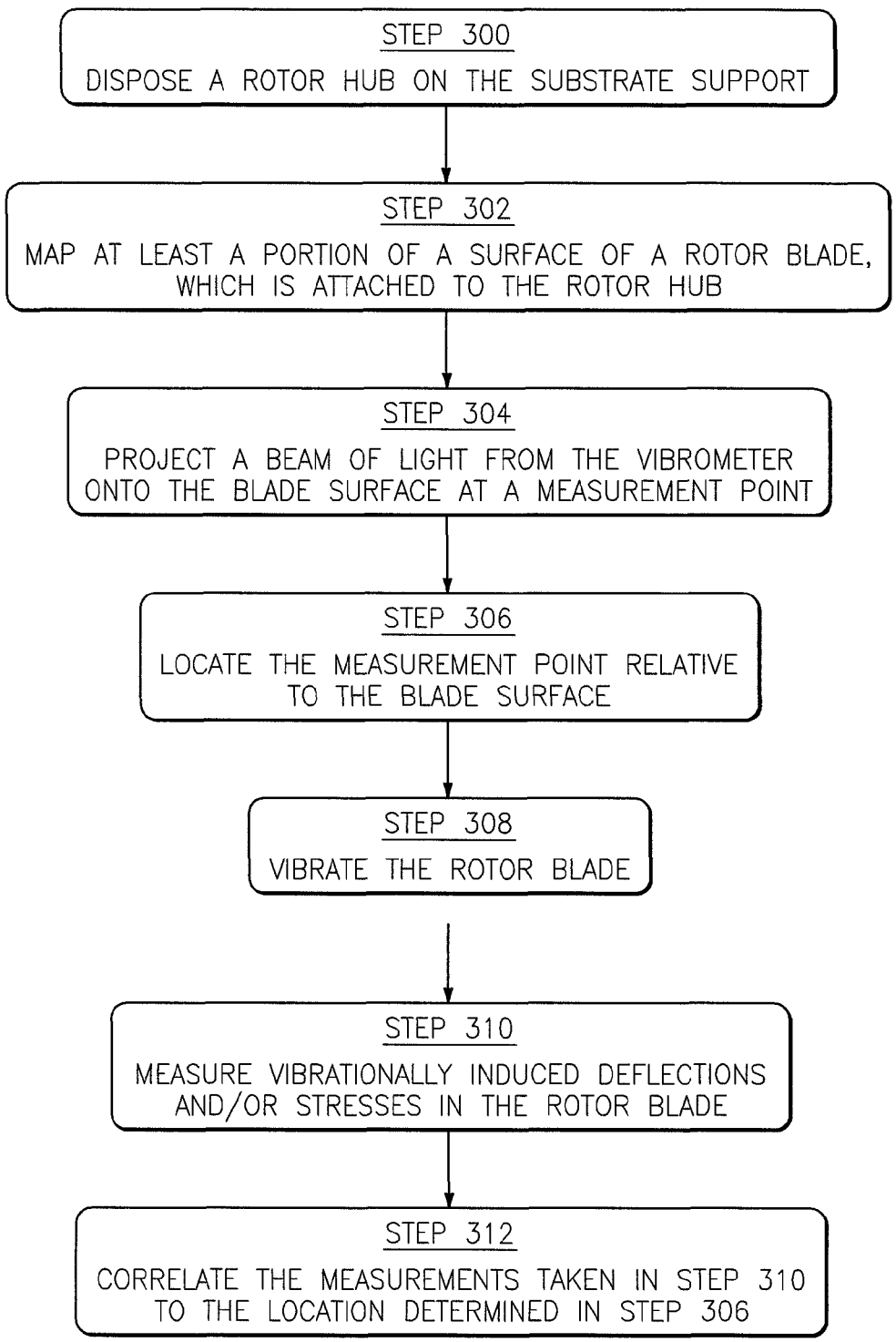
FIG. 3 illustrates a flow diagram of a method for inspecting at least a portion of the object surface illustrated in FIG. 1.

FIG. 3 illustrates a flow diagram of a method for inspecting at least a portion of the surface 12 of the object 14 (see FIG. 1). Referring to FIG. 1, the object 14 can be configured as, for example, a component of a gas turbine engine such as an integral bladed rotor (also referred to as an "IBR"). For ease of description, the object will be referred to hereinafter as the rotor 14. The rotor 14 includes a hub 62 and a plurality of blades 64 and 66. The present invention, however, is not limited to inspecting any particular object configuration and/or composition.

Referring to FIGS. 1-4, in step 300, the rotor hub 62 is disposed on the object support surface 56 such that, for example, a rotational axis of the hub 62 is aligned with the rotational axis 52 of the turntable 38.

In step 302, the controller signals the optical scanner 16 to map the surface 12 of a first one of the rotor blades 64. The projector 24, for example, can project a pattern of alternating parallel light (e.g., white, or any other suitable color) and dark (e.g., black) lines onto the blade surface 12. The lines may be distorted by contours, edges and/or other features (e.g., apertures) of the blade surface 12. Images of the lines on the blade surface 12 are captured by the cameras 26, and processed by, for example, one of the controller sub-processors to provide a three-dimensional model of the blade surface 12.

In step 304, the controller signals the vibrometer 18 to project the beam of light 32 from the laser onto the blade surface 12 at a measurement point 68.

Figure 4:
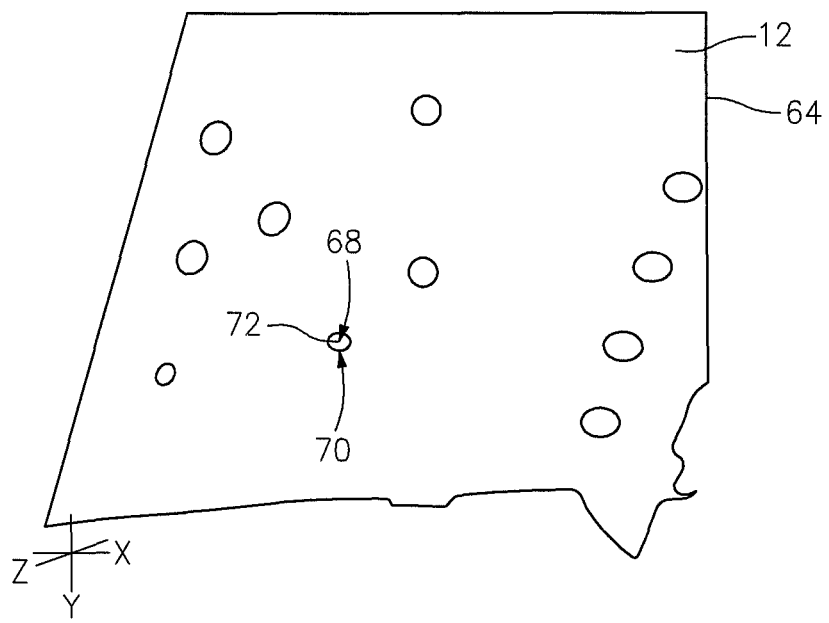
FIG. 4 is a three-dimensional model of the object surface illustrated in FIG. 1.

In step 306, the controller signals the optical scanner 16 to locate the measurement point 68 created by the laser and, thus, a location of where the beam of light 32 reflects against the blade surface 12. In one embodiment, for example, the cameras 26 capture images of the blade surface 12, which images are overexposed (e.g., missing image data) around the measurement point 68. The overexposure can be caused, for example, by the intensity and/or frequency of the reflected light being outside the detection capabilities of the cameras 26; e.g., where the intensity of the reflected light is outside the light intensity band of the cameras 26, and/or where the frequency of the reflected light is outside the frequency band of the cameras 26. The cameras 26 therefore do not capture image data from the light beam reflection point. The blade surface images can be processed by, for example, one of the controller sub-processors to provide a three-dimensional model of the blade surface 12 as shown in FIG. 4. The laser light reflection can be identified on the 3D model via the missing image data 70 (see FIG. 4). The measurement point 68 can subsequently be located using the model, for example, by (i) determining a centroid 72 of the reflection (i.e., the missing image data 70), and (ii) determining the spatial location of the centroid 72 relative to the mapped blade surface 12. Alternatively, the reflection can be identified via its intensity, color, shape, etc. where the reflection frequency is within the camera frequency band; i.e., the cameras 26 can capture image data from the reflection. In other embodiments, photogrammetry can be used to locate the position of where the beam of light 32 reflects against the blade surface 12.

Referring again to FIGS. 1-3, in step 308, the controller signals the loudspeaker 34 to transmit the excitation signal towards an underside of the first rotor blade 64 to induce a vibratory response.

In step 310, the controller signals the vibrometer 18 to measure vibrationally induced blade deflections and associated blade stresses in the first rotor blade 64 at the measurement point 68. The laser 28, for example, projects the beam of light 32 onto the blade surface 12 at the vibrometer frequency. The light detector 30 is used to determine the reflection frequency of the reflection. Doppler shifts between the vibrometer and reflection frequencies caused by the deflections can subsequently be determined to provide data indicative of a position of the blade surface 12 (e.g., a distance between the blade surface 12 and the vibrometer 18) at a particular point in time. Additional measurements can be performed over a period of time, and processed to measure the deflections and stresses caused by the deflections using known techniques.

In step 312, the controller correlates the measurements taken in step 310 to the location determined in step 306 of the measurement point 68 and, thus, the location of where the beam of light 32 reflects against the blade surface 12. In this manner, the controller can generate output data indicative of both the measurements and the location of where the measurements were taken relative to the blade surface 12 (e.g., the blade edges) without performing mechanical or post processing alignment procedures. In some embodiments, however, such alignment procedures can be performed, for example, to verify system accuracy. Subsequent processing of the output data by the controller or another computer system, therefore, can be performed to accurately predict or model how the rotor blade 64 will respond to vibrations during operation of an engine.

In some embodiments, steps 302 to 306 may be performed together such that the blade surface 12 is mapped and the measurement point 68 is located without performing multiple scans with the optical scanner 16.

In some embodiments, the vibrometer 18 can perform additional measurements at one or more alternate locations on the blade surface 12 by adjusting the position of the object turntable 38 or the vibrometer mount 58 relative to the measurement point 68. The additional measurements are subsequently correlated to the locations of where the beam of light 32 was focused on the blade surface 12 during those measurements. The locations may be determined by adding a vector indicative of the distance and direction the object turntable or the vibrometer mount were moved to the spatial location of the measurement point 68 determined in step 306.

While various embodiments of the present invention have been disclosed, it will be apparent to those of ordinary skill in the art that many more embodiments and implementations are possible within the scope of the invention. Accordingly, the present invention is not to be restricted except in light of the attached claims and their equivalents.

What is claimed is:

1. A method for inspecting a surface of an object with an optical scanner and a laser vibrometer, the method comprising:

mapping at least a portion of the object surface using the optical scanner;

projecting a beam of light from the laser vibrometer onto the object surface at a measurement point;

locating the measurement point relative to the object surface using the optical scanner; and measuring a position of the object surface using the laser vibrometer;

wherein the locating of the measurement point comprises:

detecting a reflection of the beam of light against the object surface;

determining a centroid of the reflection; and determining a relative position of the centroid to the object surface;

wherein the optical scanner is operated to detect light within a frequency band and a light intensity band; and wherein the beam of light is projected at a vibrometer frequency and an intensity, wherein at least one of the vibrometer frequency and the intensity is selected such that the reflection has at least one of a reflection frequency outside of the frequency band and a reflection intensity outside of the light intensity band.

2. The method of claim 1, wherein the reflection is detected as a function of its intensity.

3. The method of claim 1, wherein the mapping of the object surface comprises:

projecting a pattern of light onto at least the portion of the object surface with a projector; and capturing an image of the object surface with a camera.

4. The method of claim 1, further comprising:

vibrating the object; and measuring deflections of the object by measuring the position of the object surface over a period of time.

5. The method of claim 1, further comprising:

exciting the object with sound waves projected from a loudspeaker; and measuring deflections of the object by measuring the position of the object surface over a period of time.

6. The method of claim 5, further comprising determining stress in the object as a function of the measured deflections.

7. The method of claim 1, wherein the object comprises a component of a gas turbine engine.

8. The method of claim 7, wherein the component comprises an integral bladed rotor.

9. A system for inspecting a surface of an object, comprising:

a laser vibrometer adapted to project a beam of light onto the object surface at a measurement point, and to measure a position of the object surface;

an optical scanner adapted to map at least a portion of the object surface, and to locate the measurement point relative to the object surface; and a controller adapted to correlate the measured position of the object surface to the location of the measurement point;

wherein the optical scanner includes one or more cameras adapted to provide data indicative of a reflection of the beam of light against the object surface;

wherein the measurement point is located by determining a centroid of the reflection, and determining a relative position of the centroid to the object surface;

wherein the cameras are adapted to detect light within a frequency band and a light intensity band; and wherein the beam of light is projected at a vibrometer frequency and an intensity, wherein at least one of the vibrometer frequency and the intensity is selected such that the reflection has at least one of a reflection frequency outside of the frequency band and a reflection intensity outside of the light intensity band.

10. The system of claim 9, wherein the reflection is detected as a function of its intensity.

11. The system of claim 9, wherein the optical scanner includes a projector and one or more cameras, which projector is adapted to project a pattern of light onto at least the portion of the object surface, and which cameras are each adapted to capture an image of the object surface.

12. The system of claim 9, further comprising an excitation system adapted to vibrate the object, wherein the vibrometer is further adapted to measure deflections of the object by measuring the position of the object surface over a period of time.

13. The system of claim 12, wherein the excitation system includes a loudspeaker.

14. The system of claim 9, further comprising a support stand including a base, an object support and a sensor mounting stand, which object support is connected to the base and extends to an object support surface, which sensor mounting stand connects the vibrometer and the optical scanner to the base.

15. The system of claim 14, wherein the support stand further includes an object turntable adapted to rotate the object support about an axis.

16. The system of claim 14, wherein the support stand further includes an excitation system turntable that connects an excitation system to the base, which excitation system turntable is adapted to rotate the excitation system about an axis.

* * * * *